3,340,142
CONTACT AVICIDES

Andrew J. Reinert and Kenneth E. Cantrel, Bartlesville, Okla., assignors to Phillips Petroleum Company, a corporation of Delaware
No Drawing. Filed July 28, 1965, Ser. No. 475,561
8 Claims. (Cl. 167—35)

This invention relates to contact avicides. In one aspect this invention relates to contact avicides of cyanohydrins. In another aspect this invention relates to novel contact avicides having a predetermined duration of activity. Another aspect of this invention relates to a method of ridding objectionable fowl from a particular locus.

The control of birds is a problem which is currently troubling both urban and rural areas. In urban areas, the problem is primarily one of roosting birds and the attendant filth which accumulates on roofs, window ledges, sidewalks, and the like. In addition, feeding birds are particularly troublesome in rural areas. Large flocks of birds can consume large amounts of grain, fruit, and so forth, almost overnight. The loss in agricultural products due to feeding birds runs into the millions of dollars each year.

The control of birds has been approached in several different ways, including the use of scarecrows, noise makers, repellents, and poisons. The use of avicidal poisons is an effective technique but one which suffers on several disadvantages. Firstly, most such poisons must be ingested by the bird to be lethal and this, therefore, requires that the poison be combined with a palatable bait for birds. Thus, the bird must be encouraged to take the bait while not, at the same time, attracting other pets and animals to do the same. Another problem attendant with the use of most conventional avicides is the disposal of these poisons after the job is done. There is a danger of other pets and animals becoming affected by the same poison long after the objectionable birds have been killed.

It is thus an object of this invention to provide novel avicide compounds.

Another object of this invention is to provide novel avicide compounds having a predetermined life span.

A further object of this invention is to provide a method for ridding objectionable fowl from certain locus.

Other aspects, objects and the several advantages of this invention are apparent from a study of the disclosure and the appended claims.

In accordance with our invention, we have discovered a method for ridding areas of objectionable birds which comprises contacting the birds with an avicidal composition comprising a cyanohydrin. By blending acidic materials into the avicidal composition, the effective life of the avicide is regulated. In particular, lactonitrile and related cyanohydrins have been found effective as short-lived avicides which can kill objectionable birds by mere contact.

The present invention provides a means for killing objectionable birds in a manner which overcomes the aforementioned objections. The avicide composition of the present invention need not be combined with an attractive and palatable bait since it need not be ingested by the bird to be effective. It can be applied to surfaces, such as roosting surfaces, where most of the objectionable bird activity takes place. Thus, it will be essentially unavailable to other pets and animals. Further, the avicide of the present invention has a short but controllable life. After the avicide has been applied and contact made with the birds, its lethal activity will then diminish and disappear making it largely unnecessary to remove the remains of the composition, in order to prevent the accidental death of other birds or animals at a later date.

The avicidal compositions of the present invention are of the type described by the following general formula:

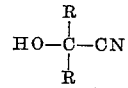

wherein R is hydrogen or an alkyl radical having up to 10 carbon atoms; at least one R is an alkyl radical, and the sum of the carbon atoms in both R groups will not exceed about 12. Some examples of these materials are 2-hydroxypropionitrile (lactonitrile), 2-hydroxyisobutyronitrile (acetone cyanohydrin), 2-hydroxy-n-butyronitrile, 2 - hydroxypentanonitrile, 2 - hydroxy-2-ethyl-n-butyronitrile, 2-hydroxyheptanonitrile, 2-hydroxy-2-ethylhexonitrile, 2 - hydroxy-3,3-dimethylheptonitrile, 2-hydroxydecanonitrile, 2-hydroxylauronitrile, 2-hydroxy-2-ethyllauronitrile, and the like.

The cyanohydrin compositions can be conventionally prepared by the reaction of hydrocyanic acid with a suitable aldehyde or ketone.

It is frequently desirable to combine the above described avicidal agents with a carrier which is capable of being absorbed by the skin of the bird or which facilitates the absorption of the cyanohydrin by the skin of the bird. Examples of such suitable carrier materials are lanolin, petroleum jelly, mineral oil, synthetic oils, organic solvents, and the like. The carrier and the active agent can also be emulsified with water so as to facilitate application as an emulsifier or as a foam. The concentration of the active agent in the carrier can vary widely but will generally be within the range of from about 0.5 to about 40 weight percent in the carrier. Of course, since contact of the bird with the avicide-containing carrier is necessary, the carrier must not be of such a nature so as to repel birds.

The maximum effectiveness of the avicidal compositions of the invention lasts up to about 6 hours. To extend this effectiveness up to about 24 hours or more, an acidic ingredient can be combined with the avicidal composition in amounts of up to about 5 weight percent of the active agent-carrier composition. Such materials can comprise mineral acids, organic acids, and their acidic salts. Chloroacetic acid has been found particularly effective in extending the active life of the avicidal compositions.

The compositions of the invention are applied by brushing, spraying, and other conventional techniques. They are applied to surfaces on which the birds normally frequent in such a manner so as to deposit an amount within the range of about 1 to about 50 grams of the active avicidal agent for each 100 square feet of surface from which the birds are to be killed. The composition can be applied to such surfaces as window ledges, roof tops, bird nests, building members, and the like.

The following examples will serve to illustrate the invention, although it is not intended that the invention be limited thereto.

EXAMPLE I

Effect on birds

In these tests, the invention avicide compounds were applied to various birds to determine their effects on the birds.

Approximately 0.5 ml. of lactonitrile was painted on the feet of a pigeon; within 6 minutes the pigeon was dead.

A chick weighing about 143 grams had its feet painted with 5 drops of lactonitrile. The chick was dead within 13 minutes.

A chick weighing 123 grams was painted with one drop of lactonitrile on the bottom of each foot. The chick was dead in 44 minutes.

A chick weighing 99 grams was painted on the bottom of the feet with acetone cyanohydrin. The chick died in 10 minutes.

Not all nitrile compounds were found effective on contact. A chick weighing 128 grams was painted on the bottom of feet with levulinonitrile

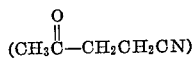
$$(CH_3\overset{O}{\overset{\|}{C}}-CH_2CH_2CN)$$

The chick suffered no ill effects. Another chick weighing 166 grams was painted on the bottom of both feet with diethylaminoacetonitrile. This chick suffered no ill effects either. Similarly, the cyanohydrin of chloroacetaldehyde was applied to the feet of several 4-day-old chicks with no observable effects.

Reasonable variations and modifications are possible within the scope of this disclosure without departing from the spirit and scope of the invention.

EXAMPLE II

Roost tests

A lanolin solution containing 20 weight percent lactonitrile was prepared. About 1 ml. of the solution was applied to a small roost within a 12 inch by 12 inch fly cage into which a male sparrow was introduced. The sparrow was dead in about 6 hours.

When this same roost was used again in another test with another sparrow after the avicidal composition was allowed to age 24 hours, the sparrow showed no ill effects.

A starling was subjected to a similar test wherein the roost was treated with a 20 weight percent solution of lactonitrile in lanolin. The starling was dead in 1 hour and 14 minutes.

Another starling was subjected to a similar test in which the avicidal composition was a 20 weight percent solution of acetone cyanohydrin in the lanolin. The starling was dead in 15 minutes.

EXAMPLE III

Tests for active life of avicide

The active life of several avicidal compositions was tested with sparrows in a 10 inch square fly cage containing a 10 inch roost which was treated with about 1.25 ml. of avicidal composition per test. The composition was a 20 weight percent solution of lactonitrile in lanolin. The treated roosts were allowed to age for specified periods of time before introducing the test sparrow. The results of these tests are shown in the following table.

| Aging of treated roosts: | Remarks |
| --- | --- |
| 0 | Sparrow dead in 2 hours. |
| 2 hours, 40 minutes | Sparrow dead in 10 minutes. |
| 4 hours | Sparrow died during the night. |
| 5 hours | No effect. |

EXAMPLE IV

Addition of acids to avicidal compositions

In a test similar to the one in Example II a sparrow was introduced into a cage whose roost was treated with about 1 ml. of a 10 weight percent solution of lactonitrile in lanolin. In addition, the avicidal composition placed on the roost also contained 5 drops of phosphoric acid. The sparrow died sometime during the night.

A composition containing 0.5 weight percent acetic acid, 10 weight percent lactonitrile, and 89.5 weight percent lanolin was applied (1 ml.) to the roost. The treated roost was aged for varying periods of time before being exposed to the bird. The results of these time tests are seen in the following table.

| Aging of treated roosts: | Remarks |
| --- | --- |
| 1 hour | Sparrow died in 32 minutes. |
| 2 hours | Sparrow died in 45 minutes. |
| 4 hours, 30 minutes | Sparrow died in 35 minutes. |
| 5 hours | Sparrow died in about 5 hours. |

Chloroacetic acid was also tested in the avicidal composition. A 1.5 ml. quantity of a composition containing 10 weight percent lactonitrile in lanolin and which also contained about 0.5 weight percent chloroacetic acid was applied to the roost. The treated roost was allowed to age for a period of time before the sparrow was introduced into the cage. The results of this series of tests is seen in the following table.

| Aging of treated roosts: | Remarks |
| --- | --- |
| 18 hours | Sparrow dead in 25 minutes. |
| 24 hours | Sparrow dead in 1 hour, 40 minutes. |
| 27 hours | Sparrow dead in 2 hours, 35 minutes. |
| 48 hours | No effect. |

The preceding examples indicate the following conclusions:

Lactonitrile and its cyanohydrin homologs are effective contact avicides whereas several other related nitrile compounds have been shown to be ineffective.

The lactonitrile avicide is non-persistent, becoming non-lethal on aging and exposure at the treating site.

The addition of acids to the lactonitrile-containing avicidal composition can be used to extend the avicidal properties.

Chloroacetic acid is particularly helpful in extending the life of this avicide.

EXAMPLE V

Field tests

An avicidal composition containing 10 weight percent lactonitrile, 0.5 weight percent chloroacetic acid, and 89.5 weight percent lanolin was painted around a hole under the eaves of a dairy feeder building which was known to be a starling nest containing several baby starlings and parents. The painting with the avicide was done at 3:00 p.m. At 1:30 p.m. of the next day the baby starlings were found dead and the parent birds presumed dead since they were missing and did not return.

In another test, the same avicidal composition was painted around the gate-lock hole in a 4 inch hollow iron gate post. The post was a starling nesting site which contained adult birds and several eggs. The next day after the treatment the nest was found empty of birds. The eggs were observed to be covered with some of the avicide. The adult birds were still missing after several weeks, and were presumed dead.

We claim:

1. A contact avicidal method which consists essentially of the step of contacting the skin of the feet of roosting birds including pigeons, sparrows, and starlings with a composition consisting essentially of (a) avicidal quantities of a cyanohydrin selected from the group consisting of 2-hydroxypropionitrile, 2-hydroxyisobutyronitrile, 2-hydroxy-n-butyronitrile, 2-hydroxypentanonitrile, 2-hydroxy-2-ethyl-n-butyronitrile, 2-hydroxyheptanonitrile, 2-hydroxy-2-ethylhexonitrile, 2 - hydroxy-3,3-dimethylheptonitrile, 2-hydroxydecanonitrile, 2-hydroxylauronitrile, 2-hydroxy-2-ethyllauronitrile, (b) 0 to 5 weight percent of an acidic compound selected from the group consisting of acetic, chloroacetic and phosphoric acids, and (c) an inert carrier capable of either being absorbed by the skin of the feet of the fowl, or of facilitating the absorption of the cyanohydrin by the skin of the feet of the fowl, selected from the group consisting of lanolin, petroleum jelly, mineral oil, synthetic oils and organic solvents, by application, of said composition to the roosting surfaces frequented by said birds including window ledges, roof tops, bird nests and buildings.

2. A method according to claim 1 wherein said composition consists essentially of 2-hydroxypropionitrile, chloroacetic acid and lanolin.

3. A method according to claim 1 wherein said composition consists essentially of 2-hydroxypropionitrile, acetic acid and lanolin.

4. A method according to claim 1 wherein said composition consists essentially of 2-hydroxyisobutyronitrile and lanolin.

5. A method according to claim 1 wherein said cyanohydrin is present in an amount in the range of about 0.5 to 40 weight percent in the inert carrier.

6. An avicidal composition consisting essentially of (a) 0.5 to 40 weight percent of an active agent selected from the group consisting of a cyanohydrin selected from the group consisting of 2-hydroxypropionitrile, 2-hydroxyisobutyronitrile, 2 - hydroxy - n - butyronitrile, 2-hydroxypentanonitrile, 2-hydroxy-2-ethyl-n-butyronitrile, 2-hydroxyheptanonitrile, 2-hydroxy-2-ethylhexonitrile, 2-hydroxy-3,3-dimethylheptonitrile, 2 - hydroxydecanonitrile, 2-hydroxylauronitrile, 2-hydroxy-2-ethyllauronitrile; (b) 0 to about 5 weight percent of an acidic compound selected from the group consisting of acetic chloroacetic and phosphoric acids, and (c) an inert carrier capable of either being absorbed by the skin of the feet of the fowl or of facilitating the absorption of the compounds of group (a) by the skin of the feet of the fowl, selected from the group consisting of lanolin, petroleum jelly, mineral oil, synthetic oils and organic solvents.

7. A composition according to claim 6 consisting of 2-hydroxypropionitrile, lanolin and chloroacetic acid.

8. A composition according to claim 6 consisting of 2-hydroxypropionitrile, lanolin and acetic acid.

References Cited
UNITED STATES PATENTS

| 840,631 | 1/1907 | Kremer | 119—25 |
| 1,300,997 | 4/1919 | Moyers | 119—156 X |
| 1,559,961 | 11/1925 | Seil et al. | 167—35 |
| 1,620,074 | 3/1927 | Christmann | 167—35 |
| 2,661,316 | 12/1953 | Martini | 167—90 |
| 2,725,334 | 11/1955 | Conrad et al. | 167—63 |
| 2,830,073 | 4/1958 | Carpenter et al. | 260—465.6 |
| 2,942,008 | 6/1960 | Lubowe | 252—364 |

OTHER REFERENCES

Cyanamid, "Chemistry of Lactonitrile," Pamphlet T-2784, 3/61-500, pp. 1–14, March 1961.

Hockenyos: "Pigeons, Starlings and English Sparrows," Proceedings, Vertebrate Pest Control Conference, Sacramento, Calif., Feb. 6–7, 1962, pp. 271, 274–276, 282, 285–291, 303–305.

Shuyler: "Bird Control in Kansas City," Pest Control 31 (9); 9–16, September 1963.

Zajanc. "Methods of Controlling Starlings and Blackbirds," Proceedings, Vertebrate Pest Control Conference, Sacramento, Calif., Feb. 6–7, 1962, pp. 190–194, 202–209.

LEWIS GOTTS, *Primary Examiner.*

S. K. ROSE, *Assistant Examiner.*